(12) United States Patent
Reiss (10) Patent No.: US 9,279,067 B2
(45) Date of Patent: *Mar. 8, 2016

(54) WET-PROCESS CERIA COMPOSITIONS FOR POLISHING SUBSTRATES, AND METHODS RELATED THERETO

(71) Applicant: Cabot Microelectronics Corporation, Aurora, IL (US)

(72) Inventor: Brian Reiss, Woodridge, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 128 days.

This patent is subject to a terminal disclaimer.

(21) Appl. No.: 14/050,722

(22) Filed: Oct. 10, 2013

(65) Prior Publication Data

US 2015/0102010 A1    Apr. 16, 2015

(51) Int. Cl.
*C09G 1/02* (2006.01)
*B24B 1/00* (2006.01)

(52) U.S. Cl.
CPC .... *C09G 1/02* (2013.01); *B24B 1/00* (2013.01)

(58) Field of Classification Search
USPC .................... 252/79.1, 79.4; 51/309; 510/175
See application file for complete search history.

(56) References Cited

U.S. PATENT DOCUMENTS

| | | |
|---|---|---|
| 5,196,353 A | 3/1993 | Sandhu et al. |
| 5,433,651 A | 7/1995 | Lustig et al. |
| 5,609,511 A | 3/1997 | Moriyama et al. |
| 5,643,046 A | 7/1997 | Katakabe et al. |
| 5,658,183 A | 8/1997 | Sandhu et al. |
| 5,730,642 A | 3/1998 | Sandhu et al. |
| 5,838,447 A | 11/1998 | Hiyama et al. |
| 5,872,633 A | 2/1999 | Holzapfel et al. |
| 5,893,796 A | 4/1999 | Birang et al. |
| 5,949,927 A | 9/1999 | Tang |
| 5,964,643 A | 10/1999 | Birang et al. |
| 6,443,812 B1 * | 9/2002 | Costas et al. ............. 451/41 |
| 6,492,308 B1 * | 12/2002 | Naghshineh et al. ...... 510/175 |
| 6,984,588 B2 | 1/2006 | Grover et al. |
| 7,071,105 B2 | 7/2006 | Carter et al. |
| 7,442,645 B2 | 10/2008 | Carter et al. |
| 2002/0034875 A1 * | 3/2002 | Park et al. ............. 438/692 |
| 2002/0098701 A1 * | 7/2002 | Hasegawa ............. 438/692 |
| 2003/0162398 A1 * | 8/2003 | Small et al. ............. 438/692 |
| 2007/0218811 A1 | 9/2007 | Kurata et al. |
| 2007/0270085 A1 | 11/2007 | Ota et al. |
| 2010/0159698 A1 * | 6/2010 | McConnell et al. ....... 438/693 |
| 2014/0024216 A1 * | 1/2014 | Stender et al. .......... 438/692 |

FOREIGN PATENT DOCUMENTS

WO   WO 2007/135794 A1   11/2007

* cited by examiner

*Primary Examiner* — Shamim Ahmed
(74) *Attorney, Agent, or Firm* — Thomas Omholt; Arlene Hornilla; Salim Hasan (57) ABSTRACT

Disclosed are a chemical-mechanical polishing composition and a method of polishing a substrate. The polishing composition comprises wet-process ceria abrasive particles, (e.g., about 120 nm or less), at least one alcohol amine, at least one surfactant having at least one hydrophilic moiety and at least one hydrophobic moiety, the surfactant having a molecular weight of about 1000, and water, wherein the polishing composition has a pH of about 6. The polishing composition can be used, e.g., to polish any suitable substrate, such as a polysilicon wafer used in the semiconductor industry.

20 Claims, 4 Drawing Sheets

WET-PROCESS CERIA COMPOSITIONS FOR POLISHING SUBSTRATES, AND METHODS RELATED THERETO

BACKGROUND OF THE INVENTION

Compositions and methods for planarizing or polishing the surface of a substrate are well known in the art. Polishing compositions (also known as polishing slurries) typically contain an abrasive material in a liquid carrier and are applied to a surface by contacting the surface with a polishing pad saturated with the polishing composition. Typical abrasive materials include silicon dioxide, cerium oxide, aluminum oxide, zirconium oxide, and tin oxide. Polishing compositions are typically used in conjunction with polishing pads (e.g., a polishing cloth or disk). Instead of, or in addition to, being suspended in the polishing composition, the abrasive material may be incorporated into the polishing pad.

The shallow trench isolation (STI) process is a method for isolating elements of a semiconductor device. In a STI process, a polysilicon layer is formed on to silicon substrate, shallow trenches are formed via etching or photolithography, and a dielectric layer (e.g., an oxide) is deposited to fill the trenches. Due to variation in the depth of trenches, or lines, formed in this manner, it is typically necessary to deposit an excess of dielectric material on top of the substrate to ensure complete filling of all trenches.

The excess dielectric material is then typically removed by a chemical-mechanical planarization process to expose the polysilicon layer. When the polysilicon layer is exposed, the largest area of the substrate exposed to the chemical-mechanical polishing composition comprises polysilicon, which must then be polished to achieve a highly planar and uniform surface. Thus, the polysilicon layer has served as a stopping layer during the chemical-mechanical planarization process, as the overall polishing rate decreases upon exposure of the polysilicon layer.

The STI substrate is typically polished using a conventional polishing composition. However, polishing STI substrates with conventional polishing compositions has been observed to result in overpolishing of the substrate surface or the formation of recesses in the STI features and other topographical defects such as microscratches on the substrate surface. Overpolishing of the substrate may also result in oxide loss and exposure of the underlying oxide to damage from polishing or chemical activity, which detrimentally affects device quality and performance.

A need remains for polishing compositions and polishing methods that will exhibit desirable planarization efficiency, uniformity, and removal rate during the polishing and planarization of substrates such as semiconductors, especially polysilicon substrates, while minimizing defectivity, such as surface imperfections and damage to underlying structures and topography during polishing and planarization. The invention provides such a polishing composition and method. These and other advantages of the invention, as well as additional inventive features, will be apparent from the description of the invention provided herein.

BRIEF SUMMARY OF THE INVENTION

In one aspect, the invention provides a chemical-mechanical polishing composition comprising, consisting essentially of, or consisting of (a) wet-process ceria abrasive particles having an average particle size of about 120 nm or less, (b) at least one alcohol amine, (c) at least one surfactant having at least one hydrophilic moiety and at least one hydrophobic moiety, the surfactant having a molecular weight of about 1,000 or more, and (d) water, wherein the polishing composition has a pH of about 6 or more.

In another aspect, the invention provides a method of polishing a substrate. The method comprises contacting a substrate with a polishing pad and a polishing composition comprising (a) wet-process ceria abrasive particles having an average particle size of about 120 nm or less, (b) at least one alcohol amine, (c) at least one surfactant having at least one hydrophilic moiety and at least one hydrophobic moiety, the surfactant having a molecular weight of about 1,000 or more, and (d) water, wherein the polishing composition has a pH of 6 or more.

DETAILED DESCRIPTION OF THE INVENTION

Embodiments of the invention provide a chemical-mechanical polishing composition comprising, consisting of, or consisting essentially of (a) wet-process ceria abrasive particles of an average particle site of about 120 nm or less, (b) one or more alcohol amines, (c) at least one surfactant having at least one hydrophilic moiety, and at least one hydrophobic moiety, the surfactant having a molecular weight of about 1,000 or more, and (d) water, wherein the polishing composition has a pH of about 6 or more. Such a polishing composition is in the form of a slurry and can be used to polish surfaces, such as mechanically weak surfaces (e.g., polysilicon) with a suitable chemical-mechanical polishing (CMP) apparatus including a polishing pad, such as described herein.

In some embodiments, the polishing composition achieves high removal rates of dielectric layers (e.g., oxides). Additionally, in some embodiments, the polishing composition achieves a low removal rate of polysilicon and/or silicon nitride. Additionally, in some embodiments, the polishing composition achieves high removal rates of dielectric layers while simultaneously achieving low removal rates of polysilicon and/or silicon nitride. Additionally, in some embodiments, the polishing composition exhibits low dishing within dielectric layer trenches. As utilized herein, the term "dishing" refers to the degree a recess forms in trenches filled with a dielectric layer. Dishing is measured by taking the difference in height between a dielectric-filled trench and an adjacent feature (e.g., a polysilicon feature). Dishing can be measured by ellipsometry known to one skilled in the art. Additionally, in some embodiments, the polishing composition exhibits uniformity in the loss of material present on a substrate. As utilized herein, the term "uniformity" refers to a measurement of the total loss of material on a substrate from specified areas of the substrate (e.g., the edge, middle, center of a substrate), and comparing the measurements from each area, wherein closer values correspond to greater uniformity. Furthermore, in some embodiments, the polishing composition achieves low defectivity on the substrate being polished. As utilized herein, the term "defectivity" refers to a count of defects (e.g., scratches), present on a substrate after polishing with a polishing composition. Defectivity can be measured by scanning electron microscopy known to one skilled in the art.

The chemical-mechanical polishing composition comprises a ceria abrasive. As known to one of ordinary skill in the art, ceria is an oxide of the rare earth metal cerium and is also known as eerie oxide, cerium oxide (e.g., cerium(IV) oxide), or cerium dioxide. Cerium(IV) oxide ($CeO_2$) can be formed by calcining cerium oxalate or cerium hydroxide. Cerium also forms cerium(III) oxides such as, for example $Ce_2O_3$. The ceria abrasive can be any one or more of these or other oxides of ceria.

The ceria abrasive can be of any suitable type. Preferably, the ceria abrasive is wet-process ceria. As used herein, "wet-process" ceria refers to a ceria prepared by a precipitation, condensation-polymerization, or similar process (as opposed to, for example, fumed or pyrogenic ceria). For example, in some embodiments, the wet-process ceria is formed by precipitating a cerium-containing precursor by adjusting pH and pressure to control the precipitation to achieve a controlled particle size. Thus, wet-process techniques can result in smaller particles by controlling the particle growth in this manner, in contrast to dry process techniques where a calcining process is typically used to try and anneal the cerium oxide from ceria-containing precursor to achieve the crystallinity that is desired.

A polishing composition of the invention comprising wet-process ceria abrasive has been typically found to exhibit lower defects when used to polish substrates according to a method of the invention. Without wishing to be bound to a particular theory, it is believed that wet-process ceria comprises substantially spherical ceria particles and/or smaller ceria particles, thereby resulting in lower substrate defectivity when used in the inventive method. It is further believed that the wet-process ceria particles as described herein will contact a substrate, such as a wafer, with less momentum and energy, thereby reducing size and frequency of defects such as scratches. An illustrative wet-process ceria is HC-60™ ceria commercially available from Rhodia, Cranbury, N.J.

For non-spherical particles, the size of the particle is the diameter of the smallest sphere that encompasses the particle. The unmodified phrase "particle size", as utilized herein, may refer to one or both of primary and secondary particles. Primary particles refer to those individual ceria particles dispersed in aqueous carrier (e.g., water), whereas secondary particles refer to aggregates of individual ceria particles fused together in water. The particle size can be measured using any suitable technique, for example, using laser diffraction techniques known to those skilled in the art.

The ceria abrasive particles can have any suitable average particle size of about 150 nm or less. For example, the ceria abrasive particles can have an average particle size of about 150 nm or less, e.g., about 140 nm or less, about 130 nm or less, about 115 nm or less, about 110 nm or less, about 100 nm or less, about 90 nm or less, about 80 nm or less, about 70 nm or less, about 60 nm or less, about 50 nm or less, about 40 nm or less, about 30 nm or less, about 20 nm or less, about 10 nm or less, about 5 nm or less, about 3 nm or less, about 2 nm or less, about 1 nm or less, or about 0.1 nm or less. Each of the aforementioned endpoints can have a lower limit, e.g., ranging from about 0.1 nm to about 150 nm, as numerically appropriate, such as a lower limit of about 0.1 nm, about 1 nm, about 2 nm, about 3 nm, about 4 nm, about 5 nm, about 6 nm, about 7 nm, about 10 nm, about 20 nm, about 30 nm, about 50 nm, about 70 nm, about 100 nm, about 110 nm, about 120 nm, about 130 nm, about 140 nm, or about 150 nm. For example, the ceria abrasive particles can have an average particle size from about 0.1 nm to about 150 nm, e.g., from about 10 nm to about 120 nm, from about 50 nm to about 70 nm, from about 40 nm to about 80 nm, from about 7 nm to about 90 nm, from about 5 nm to about 30 nm, or from about 20 nm to about 110 nm etc. Preferably, the ceria abrasive particles have au average particle size of about 120 nm or less.

In some embodiments, the abrasive particles can have an average primary particle size of about 85 nm or less. The ceria abrasive particles can have any suitable average primary particle size of about 85 nm or less, e.g., about 80 nm or less, about 75 nm or less, about 65 nm or less, about 60 nm or less, about 55 nm or less, about 50 nm or less, about 45 nm or less, about 40 nm or less, about 30 nm or less, about 20 nm or less, about 10 nm or less, about 5 nm or less, about 3 nm or less, about 1 nm or less, or about 0.1 nm or less. Each of the aforementioned endpoints can have a lower limit, e.g., ranging from about 0.1 nm to about 85 nm, as numerically appropriate, such as a lower limit of about 0.1 nm, about 1 nm, about 2 nm, about 3 nm, about 4 nm, about 5 nm, about 6 nm, about 7 nm, about 10 nm, about 12 nm, about 15 nm, about 20 nm, about 30 nm, about 40 nm, about 50 nm or about 65 nm. For example, the ceria abrasive particles can have an average primary particle size from about 0.1 nm to about 85 nm, e.g., from about 10 nm to about 30 nm, from about 5 nm to about 50 nm, from about 3 nm to about 45 nm, from about 40 nm to about 55 nm, from about 12 nm to about 20 nm, or from about 15 nm about 65 nm. Preferably, the ceria abrasive particles have an average primary particle size of about 65 nm or less.

The ceria abrasive particles can have any suitable average secondary particle size of about 150 nm or less. For example, the ceria abrasive particles can have an average secondary particle size of about 150 nm or less, e.g., about 40 nm or less, about 130 nm or less, about 115 nm or less, about 110 nm or less, or about 100 nm or less. Each of the aforementioned endpoints can have a lower limit, e.g., ranging from about 0.1 nm to about 150 nm, as numerically appropriate, such as a lower limit of about 70 nm, about 80 nm, about 90 nm, about 100 nm, about 110 nm, about 120 nm, about 130 nm, about 140 nm, or about 150 nm. For example, the ceria abrasive particles can have an average secondary particle size from about 100 nm to about 150 nm, e.g., from about 110 nm to about 140 nm, or from about 120 nm to about 130 nm. Preferably, the ceria abrasive particles have an average secondary particle size of about 120 nm or less.

In accordance with some embodiments, the ceria abrasive particles are substantially free of agglomeration in the polishing composition. Agglomeration creates larger particle sizes in a polishing composition, thus producing higher impact collisions upon the substrate surface being polished with a polishing composition. Thus, agglomeration can result in higher defectivity on the substrate surface. As utilized herein the phrase "substantially free" means zero agglomeration or an immaterial amount of agglomeration. An immaterial amount of agglomeration can be, e.g., 1% or less by weight of all ceria particles in the polishing composition, such as, for example, about 0.5% or less, about 0.1% or less, about 0.01% or less, about 0.001% or less, or about 0.0001% or less.

The ceria particles preferably are colloidally stable in the inventive polishing composition. The term colloid refers to the suspension of abrasive particles in the liquid carrier. Colloidal stability refers to the maintenance of that suspension through time in the context of the invention, the ceria abrasive is considered colloidally stable if, when the abrasive is placed into a 100 ml graduated cylinder and allowed to stand unagitated for a time of 2 hours, the difference between the concentration of particles in the bottom 50 ml of the graduated cylinder ([B] in terms of g/ml) and the concentration of the particles in the top 50 ml of the graduated cylinder ([T] in terms of g·ml) divided by the initial concentration of particles in the abrasive composition ([C] in terms of g/ml) is less than or equal to 0.5 (i.e., $\{[B]-\{T\}\}/[C] \leq 0.5$). More preferably, the value of [B]−[T]/[C] is less than or equal to 0.3, and most preferably is less than or equal to 0.1.

The ceria abrasive particles can be present in the polishing composition at any suitable amount. If the polishing composition of the invention comprises too little ceria abrasive, the composition may not exhibit a sufficient removal rate. In contrast, if the polishing composition comprises too much ceria abrasive, the polishing composition may exhibit undesirable polishing performance and/or may not be cost effective and/or may lack stability. Advantageously, in some embodiments the ceria abrasive particles are present in lower solids concentrations as compared with conventional systems, which often exceed 10-12 wt. % solids. The use of lower amounts of ceria abrasive particles, in accordance with embodiments of the invention, can result in lower defectivity and substantial cost savings.

For example, the ceria abrasive particles can be present at a concentration of about 0.0005 wt. % or more, e.g., about 0.001 wt. % or more, about 0.0005 wt. % or more, about 0.01 wt. % or more, about 0.05 wt. % or more, about 0.1 wt. % or more, or about 0.5 wt. % or more. Alternatively, or in addition, the ceria abrasive particles can be present in the polishing composition at a concentration of about 10 wt. % or less e.g., about 9 wt. % or less, about 8 wt. % or less, about 7 wt. % or less, about 5 wt. % or less, about 3 wt. % or less, about 2 wt % or less, or about 1 wt. % or less. Thus, the polishing composition can include ceria abrasive particles at a concentration within a range bounded by any two of the aforementioned endpoints. For example, the ceria abrasive particles can be present at a concentration from about 0.005 wt. % to about 10 wt. %, e.g., from about 0.1 wt. % to about 1 wt. %, from about 0.01 wt. % to about 3 wt. %, from about 0.005 wt. % to about 7 wt. %, from about 0.05 wt. % to about 9 wt %, from about 0.5 wt. % to about 8 wt. %, or from about 0.001 wt. % to about 5 wt. %. Preferably, the ceria abrasive particles are present in the polishing composition at a concentration of about 0.001 wt. % to about 2 wt. %. In some embodiments, the ceria abrasive particles are present in an amount of about 1 wt. % or less, such as from about 0.1 wt. % to about 1 wt. %, e.g., from about 0.1 wt. % to about 0.7 wt. %, about 0.1 wt. % to about 0.5 wt. %, 0.1 wt. % to about 0.3 wt. % (e.g., 0.2 wt. %).

The alcohol amine is included in the polishing composition, in some embodiments, to modify the surface properties of the substrate being polished so as to make the substrate surface more receptive to interaction with abrasive particles. The pH of the polishing composition plays an important role in determining the interactions between the polishing composition and the surface of substrate being polished. An alcohol amine is included in some embodiments to facilitate increasing the pH of the polishing composition to at least about a pH of 6, about 7, or higher (e.g., a pH from about 6 to about 11), without destabilizing the ceria abrasive particles. In this respect, the native ceria particles can have a lower pH (e.g., about 4), and the alcohol amine can act as a primary pH adjustor in the polishing composition to prevent particle growth in the form of agglomerated particles, which would fall out of solution, at a pH of 6. Thus, the presence of the alcohol amine can reduce the onset of agglomeration of certa abrasive particles and precipitation thereof which might otherwise occur at a pH of about 6.

The pH of the polishing composition can be any suitable pH of at least 6 or more, e.g., about 6.5 or more, about 7 or more, about 7.5 or more, about 8 or more, about 8.5 or more, about 9 or more, about 9.5 or more, or about 10 or more. In addition, the pH of the polishing composition can be 14 or lower, e.g., about 13.5 or lower, about 13 or lower, about 12.5 or lower, about 12 or lower, about 11.5 or lower, about 11 or lower, about 10.5 or lower, about 10 or lower, about 9.5 or lower, about 9 or lower, about 8.5 or lower, or about 8 or lower. Thus, the pH of the polishing composition can be within a range bounded by any of the aforementioned endpoints. For example, the pH of the polishing composition can be about 6 to about 14, e.g., about 6 to about 10, about 6 to about 8, about 6 to about 7, about 7 to about 14, about 7 to about 10, or about 8 to about 12.

In order for the alcohol amine to interact with the substrate within this pH range, in some embodiments, the alcohol amine desirably bears a functional group having a pKa (in water) from about 7 to about 11, such as from about 7.5 to about 10, e.g. from about 8 to about 9, e.g., such that the alcohol amine acts as a base in water. In some embodiments, the alcohol amine has an isoelectric point (pKi, also referred to as pI) from about 6 to about 10, such as from about 7.5 to about 9, e.g., from about 6.5 to about 7.

The alcohol amine can be any suitable alcohol amine. Preferably, the alcohol amine is 2-dimethylamino-2-methylpropanol (DMAMP), triethanolamine, diethanolamine, ethanolamine, 2-amino-2-2methyl-1,3propanediol, Bis-Tris, Tris, co-formed products thereof, or combinations thereof.

The alcohol amine can be present in any suitable concentration. For example, the alcohol amine can be present at a concentration of about 0.0005 wt. % or more, e.g., about 0.005 wt. % or more, 0.01 wt. % or more, about 0.05 or more, about 0.1 wt. % or more, or about 0.5 wt. % or more. Alternatively, or in addition, the alcohol amine can be present in the polishing composition at a concentration of about 5 wt. % or less, e.g., about 4 wt. % or less, about 3 wt. % or less, about 2 wt. % or less, or about 1 wt. % or less. Thus, the alcohol amine can be present in the polishing composition at a concentration within a range bounded by any two of the aforementioned endpoints. For example, the alcohol amine can be present at a concentration from about 0.005 wt. % to about 5 wt. %, e.g., from about 0.01 wt. % to about 3 wt. %, from about 0.1 wt. % to about 2 wt. %, from about 0.005 wt. % to about 4 wt. %, or from about 0.05 wt. % to about 1 wt. %. Preferably, the alcohol amine is present in the polishing composition at a concentration from about 0.001 wt. % to about 1 wt. %.

The pH of the polishing composition can be achieved and/or maintained by any suitable means. More specifically, the polishing composition can further comprise a secondary pH adjustor used alone or in conjunction with an alcohol amine, a pH buffering agent, or combination thereof. The secondary pH adjuster can be any suitable pH-adjusting compound, for example any suitable acid. Typically, the acid is acetic acid, nitric acid, phosphoric acid, oxalic acid, and combinations thereof. Preferably, the acid is nitric acid. The secondary pH adjustor can alternatively be a base. The base can be any suitable base. Typically, the base is potassium hydroxide, ammonium hydroxide, and combinations thereof. The pH buffering agent can be any suitable buffering agent. For example, the pH buffering agent can be a phosphate, sulfate, acetate, borate, ammonium salt, and the like. The polishing composition can comprise any suitable amount of a pH adjustor and/or a pH buffering agent, provided that a suitable amount is used to achieve and/or maintain the pH of the polishing composition within the pH ranges set forth herein.

The surfactant including at least one hydrophilic moiety and at least one hydrophobic moiety can be any suitable surfactant. For example, the surfactant including at least one hydrophilic moiety and at least one hydrophobic moiety can have any suitable molecular weight of about 1,000 or more. For example, the surfactant can have a molecular weight of about 1,500 or less, e.g., about 1,400 or less, about 1,300 or less, about 1,250 or less, about 1,200 or less, about 1,150 or less, about 1,100 or less, or about 1,050 or less. Alternatively, or in addition, the surfactant can have a molecular weight of about 600 or more, e.g., about 700 or more, about 750 or more, about 800 or more, about 850 or more, about 900 or more, about 950 or more, or about 1,000 or more. Thus, the surfactant can have a molecular weight in a range bounded by any two of the aforementioned endpoints. For example, the surfactant can have a molecular weight from about 600 to about 1,500, from about 700 to about 1,400, from about 800 to about 1,150, from about 900 to about 1,100, or from about 850 to about 1,050.

In some embodiments, the surfactant including at least one hydrophilic moiety and at least one hydrophobic moiety has a molecular weight from about 250 to about 7,500. The surfactant can have any suitable molecular weight from about 250 to about 7,500. For example, the surfactant can have a molecular weight of about 50 or more, e.g., about 100 or more, about 150 or more, about 200 or more, about 400 or more, about 500 or more, about 1,000 or more, about 2,500 or more, about 3,000 or more, about 3,500 or more, about 4,000 or more, or about 4,500 or more. Alternatively, or in addition, the surfactant can have a molecular weight of about 10000 or less, e.g., about 9,000 or less, about 8,000 or less, about 7,000 or less, about 6,500 or less, about 6,000 or less, about 5,500 or less, or about 5,000 or less. Thus, the surfactant can have a molecular weight in a range bounded by any the two of the aforementioned endpoints. For example, the surfactant can have a molecular weight from about 50 to about 10,000, e.g., from about 300 to about 7,000, from about 400 to about 9,000, from about 2,500 to about 6,000, from about 500 to about 6,500, from about 3,000 to about 5,000 or from about 3,500 to about 5,500. Preferably, the surfactant including at least one hydrophilic moiety and at least one hydrophobic moiety has a molecular weight from about 500 to about 5,000.

The surfactant including at least one hydrophilic and at least one hydrophobic moiety can be present at a concentration of about 0.0005 wt. % or more, e.g., about 0.005 wt. % or more, about 0.01 wt. % or more, about 0.05 wt. % or more, about 0.1 wt. % or more, or about 0.5 wt % or more. Alternatively, or in addition, the surfactant can be present in the polishing composition at a concentration of about 5 or less, e.g., about 4 wt. % or less, about 3 wt. % or less, about 2 wt. % or less, or about 1 wt. % or less. Thus, the surfactant can be present in the polishing, composition at a concentration within a range bounded by any two of the aforementioned endpoints. For example, the surfactant can be present at a concentration from about 0.005 wt. % to about 5 wt. %, from about 0.01 wt. % to about 3 wt. %, from about 0.1 wt. % to about 2 wt. %, from about 0.005 wt. % to about 4 wt. %, or from about 0.05 wt. % to about 1 wt. %. Preferably, the surfactant is present in the polishing composition at a concentration from about 0.001 wt. % to about 1 wt. %.

Optionally, in some embodiments the surfactant including at least one hydrophilic moiety and at least one hydrophobic moiety can be of the formula: A-R—C, wherein A and C are hydrophilic moieties, and R is a hydrophobic moiety.

In some embodiments, surfactants used in polishing compositions with the formula A-R—C, can be bifunctional, with A and C comprising the same or different moieties. As utilized herein, the term "bifunctional" refers to a molecule with at least two functional groups. In some embodiments, the bifunctional compound includes carboxylate groups on both ends with a hydrophobic spacer in between, e.g., as seen in Formula I below.

In some embodiments, at least one of A and C includes at least one of ester, carboxylic, and alcohol functional groups or any co-product or combination thereof.

In some embodiments, at least one of A and C includes an alcohol functional group attached to a primary carbon. The alcohol functional group can be any suitable alcohol functional group. For example, the alcohol functional group can comprise methanol, ethanol, isopropyl alcohol, butyl alcohol, pentanol hexadecan-1-ol, ethane-1,2-diol, propane-1,2-diol, propane-1,2,3-triol, butane-1,2,3,4-tetraol, pentane-1,2,3,4,5-pentol, hexane-1,2,3,4,5,6-hexol, heptane-1,2,3,4,5,6,7-heptol, co-formed products thereof, or combinations thereof.

In some embodiments, at least one of A and C includes a carboxylic functional group attached to a tertiary carbon. The carboxylic functional group can be any suitable carboxylic functional group. For example, the carboxylic functional group can comprise formic acid, acetic acid, propionic acid, butyric acid, valeric acid, caproic acid, enanthic acid, caprylic acid, pelargonic acid, capric acid, lauric acid, palmitic acid, stearic acid, acrylic acid, docosahexaenoic acid, eicosapentaenoic acid, acetoacetic benzoic acid, salicylic acid, aldaric acid, oxalic acid, malonic acid, malic acid, succinic acid, glutaric acid, adipic acid, citric acid, isocitric acid, aconitic acid, tricarballylic acid, carballylic acid and lactic acid, and tartaric acid.

In some embodiments, the surfactant is a polyol. In some embodiments, the polyol includes carboxylate and/or alcohol functionalities on two ends with a tunable hydrophobic spacer in between. For example, in some embodiments, the surfactant including at least one hydrophilic moiety and at least one hydrophobic moiety is a polyol of the following chemical formula (Formula I):

wherein R is

In some embodiments, R has a molecular weight from about 50 to about 15,000. R can have any suitable molecular weight from about 50 to about 15,000. For example, R can have a molecular weight of about 25 or more, e.g., about 50 or more, about 60 or more, about 100 or more, about 200 or more, about 500 or more, about 750 or more, about 1,000 or more, about 2,500 or more, about 5,000 or more, about 7,000 or more, about 8,500 or more, or about 10,000 or more. Alternatively, or in addition, R can have a molecular weight of about 15,000 or less, e.g., about 14,000 or less, about 13,000 or less, about 12,500 or less, about 11,500 or less, about 11,000 or less or about 10,500 or less. Thus, R can have a molecular weight in a range bounded by any two of the aforementioned endpoints. For example, R can have a molecular weight from about 25 to about 15,000, e.g., from about 1,000 to about 13,000, from about 100 to about 12,500, from about 7,000 to about 11,500, or from about 5,000 to about 11,000. Preferably, R has a molecular weight from about 100 to about 10,000.

It has been found that butane diol and hexane diol are less desired surfactants in accordance with some embodiments of the invention. Thus in some embodiments, the polishing composition is substantially free of diols such as butane diol and hexane diol. As utilized herein the phrase "substantially free" means zero of such dial or an immaterial amount. An immaterial amount of agglomeration can be, e.g., 5% or less by weight of the polishing composition, such as, for example, about 4% or less, about 3% or less, about 2% or less, about 1% or less, or about 0.5% or less, or about 0.1% or less.

Optionally, in some embodiments, the polishing composition can include one or more nonionic surfactants. The nonionic surfactant can be any suitable nonionic surfactant. Preferably, the nonionic surfactant is polysorbate, polysorbate 20, polysorbate 60, polysorbate 65, polysorbate 80, polysorbate 85, sorbitan, polyoxyethylene ether, ethoxylate, acrylic, polyether polyol, hydropalat 3233, sorbitan monolaurate, polyoxyethylene (40) nonylphenyl ether, pentaerythritol ethoxylate, glycerol propoxylate-block-ethoxylate, acrylic copolymer, polypropylene oxide-based triol co-formed products thereof, or combinations thereof. In some embodiments, the nonionic polymer functions as a surfactant and/or wetting agent. The presence of the nonionic surfactant advantageously allows for useful removal rates for dielectric layers (e.g., oxides) while reducing removal rates for polysilicon. Additionally, the presence of nonionic surfactant, in some embodiments of the invention, allows for low dishing. Furthermore, in some embodiments of the invention, the presence of nonionic surfactant allows for low defectivity the substrate being polished.

If present in the polishing composition, the nonionic surfactant can be present at any suitable concentration in the polishing composition. For example, the nonionic surfactant can be present at a concentration of about 0.0005 wt. % or more, e.g., about 0.005 wt. % or more, about 0.01 wt. % or more, about 0.05 wt. % or more, about 0.1 wt. % or more, or about 0.5 wt. % or more. Alternatively, or in addition, the nonionic surfactant can be present in the polishing composition at a concentration of about 5 wt. % or less, e.g., about 4 wt. % or less, about 3 wt. % or less, about 2 wt. % or less, or about 1 wt. % or less. Thus, the nonionic surfactant can be present in the polishing composition at a concentration in a range bounded by any two of the aforementioned endpoints. For example, the nonionic surfactant can be present at a concentration from about 0.005 wt. % to about 5 wt. %, e.g., from about 0.01 wt. % to about 3 wt. %, front about 0.1 wt. % to about 2 wt. %, from about 0.005 wt. % to about 4 wt. %, or from about 0.05 wt. % to about 1 wt. %. Preferably, the nonionic surfactant is present in the polishing composition at a concentration from about 0.001 wt. % to about 1.0 wt. %.

The nonionic surfactant can have any suitable hydrophobic lipophilic balance (HLB). For example, the nonionic surfactant can have an HLB of about 3 or more, e.g., about 4 or more, about 5 or more, about 5 or more, about 7 or more, about 8 or more, 9 or more, about 10 or more, or about 11 or more. Alternatively, or in addition, the nonionic surfactant can have an HLB of about 22 or less, e.g., about 21 or less, about 20 or less, about 19 or less, about 18 or less, about 17 or less, about 16 or less, about 15 or less, about 14 or less, about 13 or less, or about 12 or less. Thus, the nonionic surfactant can have an HLB in a range bounded by any two of the aforementioned endpoints. For example, the nonionic surfactant can have an HLB from about 3 to about 22, from about 4 to about 21, from about 5 to about 20, from about 6 to about 19, from about 10 to about 13, or from about 8 to about 15. Preferably, the nonionic surfactant has an HLB from about 7 to about 18.

Optionally, in some embodiments, the polishing composition can include one or more thickeners. The thickener can be included, for example, to serve as a dishing reducer. The thickener can be any suitable thickener. Preferably, the thickener is a cellulosic compound, dextran, polyvinyl alcohol, carrageenan, chitosan, hydroxyethylcellulose, carboxyethylcellulose, hydroxymethylcellulose, methylcellulose, hydroxypropylcellulose, co-formed products thereof, or combinations thereof.

If present in the polishing composition, the thickener can be present at any suitable concentration in the polishing composition. For example, the thickener can be present at a concentration of about 0.0005 wt. % or more, e.g., about 0.005 wt. % or more, about 0.01 wt. % or more, about 0.05 wt. % or more, about 0.1 wt. % or more, or about 0.5 wt. % or more. Alternatively, or in addition, the thickener can be present in the polishing composition at a concentration of about 5 wt. % or less, e.g., about 4 wt. % or less, about 3 wt. % or less, about 2 wt. % or less, or about wt. % or less. Thus, the thickener can be present in the polishing composition at a concentration in a range bounded by any two of the aforementioned endpoints. For example, the thickener can be present at a concentration from about 0.005 wt. % to about 5 wt. %, e.g., from about 0.01 wt. % to about 3 wt. %, from about 0.1 wt. % to about 2 wt. %, from about 0.005 wt. % to about 4 wt. %, or from about 0.05 wt. % to about 1 wt. %. Preferably, the thickener is present the polishing composition at a concentration from about 0.001 wt. % to about 1 wt. %.

Optionally, in some embodiments, the polishing composition can include one or more cationic polymers, for example, to serve as removal rate promoters, defectivity reducers, or both. The cationic polymer can be any suitable cationic polymer. Preferably, the cationic polymer is poly(methacryloxy-ethyhrimethyammonium) chloride (polyMADQUAT), poly(diallyldimethylammonium) chloride (polyDADMAC), poly(acrylamide), poly(allylamine), poly(vinylimmidazolium), poly(vinylpyridium), co-formed products thereof, or combinations thereof.

If present in the polishing composition, the cationic polymer can be present at any suitable concentration in the polishing composition. For example, the cationic polymer can be present at a concentration of about 0.0005 wt. % or more, e.g., about 0.005 wt. % or more, about 0.01 wt. % or more, about 0.05 wt. % or more, about 0.1 wt. % or more, or about 0.5 wt. % or more. Alternatively, or in addition, the cationic polymer can be present in the polishing composition at a concentration of about 5 wt. % or less, e.g., about 4 wt. % or less, about 3 wt. % or less, about 2 wt. % or less, or about 1 wt. % or less. Thus, the cationic polymer can be present in the polishing composition at a concentration in a range bounded by any two of the aforementioned endpoints. For example, the cationic polymer can be present at a concentration from about 0.005 wt. % to about 5 wt. %, e.g., from about 0.01 wt. % to about 3 wt. %, from about 0.1 wt. % to about 2 wt. %, from about 0.005 wt. % to about 4 wt. %, or from about 0.05 wt. % to about 1 wt. %. Preferably, the cationic polymer is present in the polishing composition at a concentration from about 0.001 wt. % to about 1 wt. %.

Optionally, the polishing composition further comprises one or more additives. Illustrative additives include conditioners, acids (e.g., sulfonic acids), complexing agents (e.g., anionic polymeric complexing agents), chelating agents, biocides, scale inhibitors, dispersants, etc.

The biocide can be any suitable biocide and can be present in the polishing composition in any suitable amount. A suitable biocide is an isothuazolinone biocide. The amount of biocide used in the polishing composition typically is about 1 to about 50 ppm, preferably about 10 to about 20 ppm.

The polishing composition can be prepared by any suitable technique, many of which are known to those skilled in the art. The polishing composition can be prepared by batch or continuous process. Generally, the polishing, composition can be prepared by combining the components described herein in any order. The term "component" as used herein includes individual ingredients (e.g., ceria abrasive, alcohol amine, surfactant including at least one hydrophilic moiety and at least one hydrophobic moiety, water, optional nonionic surfactant, optional thickener, optional cationic polymer, and/or any optional additive) as well as any combination of ingredients ceria abrasive, alcohol amine, surfactant including at least one hydrophilic moiety and at least one hydrophobic moiety, water, optional nonionic, surfactant, optional thickener, optional cationic polymer, etc.).

For example, the polishing composition can be prepared by (i) providing all or a portion of the liquid carrier, (ii) dispersing the ceria abrasive, alcohol amine, surfactant including at least one hydrophilic and at least one hydrophobic moiety, water, optional nonionic surfactant, optional thickener, optional cationic polymer, and/or any optional additive, in the liquid carrier using any suitable means for preparing such a dispersion, (iii) adjusting the pH of the dispersion as appropriate, and (iv) optionally adding suitable amounts of any other optional components and/or additives to the mixture.

Alternatively, the polishing composition can be prepared by (i) providing one or more components (e.g., surfactant including at least one hydrophilic moiety and at least one hydrophobic moiety, water, optional nonionic surfactant, optional thickener, optional cationic polymer, and/or any optional additive) in a cerium oxide slurry, (ii) providing one or more components in an additive solution (e.g., surfactant including at least one hydrophilic moiety and at least one hydrophobic moiety, water, optional nonionic surfactant, optional thickener, optional cationic polymer, and/or any optional additive), (iii) combining the cerium oxide slurry and the additive solution to form a mixture, (iv) optionally adding suitable amounts of any other optional additives to the mixture, and (v) adjusting the pH of the mixture as appropriate.

The polishing composition can be supplied as a one-package system comprising a ceria abrasive, alcohol amine, surfactant including at least one hydrophilic moiety and at least one hydrophobic moiety, optional nonionic surfactant, optional thickener, optional cationic polymer, and/or any optional additive, and water. Alternatively, the polishing composition of the invention can be supplied as a two-package system comprising a cerium oxide slurry and an additive solution, wherein the ceria oxide slurry consists essentially of, or consists of, a ceria abrasive, surfactant including at least one hydrophilic moiety and at least one hydrophobic moiety, optional nonionic surfactant, optional thickener, optional cationic polymer, and/or any optional additive. The two-package system allows for the adjustment of substrate global flattening characteristics and polishing speed by changing the blending ratio of the two packages, i.e., the cerium oxide shiny and additive solution.

Various methods can be employed to utilize such a two-package polishing system. For example, the cerium oxide slurry and additive solution can be delivered to the polishing table by different: pipes that are joined and connected at the outlet of supply piping. The cerium oxide slurry and additive solution can be mixed shortly or immediately before polishing, or can be supplied simultaneously on the polishing table. Furthermore, when mixing the two packages, deionized water can be added, as desired, to adjust the polishing composition and resulting substrate polishing characteristics.

Similarly, a three-, four-, or more package system can be utilized in connection with the invention, wherein each of multiple containers contains different components of the inventive chemical-mechanical polishing composition, one or more optional components, and/or one or more of the same components in different concentrations.

In order to mix components contained in two or more storage devices to produce the polishing composition at or near the point-of-use, the storage devices typically are provided with one or more flow lines leading from each storage device to the point-of-use of the polishing composition (e.g., the platen, the polishing pad or the substrate surface itself). As utilized herein the term "point-of-use" refers to the point at which the polishing composition is applied to the substrate surface (e.g., the polishing pad or the substrate surface itself). By the term "flow line" is meant a path of flow from an individual storage container to the point-of-use of the component stored therein. The flow lines can each lead directly to the point-of-use, or two or more of the flow lines can be combined at any point into a single flow line that leads to the point-of-use. Furthermore, any of the flow lines (e.g., the individual flow lines or a combined flow line) can first lead to one or more other devices (e.g., pumping device, measuring device, mixing device, etc.) prior to reaching the point-of-use of the component(s).

The components of the polishing composition can be delivered to the point-of-use independently (e.g., the components are delivered to the substrate surface whereupon the components are mixed during the polishing process), or one or more of the components can be combined before delivery to the point-of-use, e.g., shortly or immediately before delivery to the point-of-use. Components are combined "immediately before delivery to the point-of-use" if the components are combined about 5 minutes or less prior to being added in mixed from onto the platen, for example, about 4 minutes or less, about 3 minutes or less, about 2 minutes or less, about 1 minute or less, about 45 s or less, about 30 s or less, about 10 s or less prior to being added in mixed form onto the platen, or simultaneously to the delivery of the components at the point-of-use (e.g., the components are combined at a dispenser). Components also are combined "immediately before delivery to the point-of-use" if the components are combined within 5 m of the point-of-use, such as within 1 m of the point-of-use or even within 10 cm of the point-of-use (e.g., within 1 cm of the point-of-use).

When two or more of the components of the polishing composition are combined prior to reaching the point-of-use, the components can be combined in the flow line and delivered to the point-of-use without the use of a mixing device. Alternatively, one or more of the flow lines can lead into a mixing device to facilitate the combination of two or more of the components. Any suitable mixing device can be used. For example, the mixing device can be a nozzle or jet (e.g., a high pressure nozzle or jet) through which two or more of the components flow. Alternatively, the mixing device can be a container-type mixing device comprising one or more inlets by which two or more components of the polishing slurry are introduced to the mixer, and at least one outlet through which the mixed components exit the mixer to be delivered to the point-of-use, either directly or via other elements of the apparatus (e.g., via one or more flow lines). Furthermore, the mixing device can comprise more than one chamber, each chamber having at least one inlet and at least one outlet, wherein two or more components are combined in each chamber. If a container-type mixing device is used, the mixing device preferably comprises a mixing mechanism to further facilitate the combination of the components. Mixing mechanisms are generally known in the art and include stirrers, blenders, agitators, paddled baffles, gas sparger systems, vibrators, etc.

The polishing composition also can be provided as a concentrate which is intended to be diluted with an appropriate amount of water prior to use. In such an embodiment, the polishing composition concentrate comprises the components of the polishing composition in amounts such that, upon dilution of the concentrate with an appropriate amount of water, each component of the polishing composition will be present in the polishing composition in an amount within the appropriate range recited above for each component. For example, the ceria abrasive, alcohol amine, surfactant including at least one hydrophilic moiety and at least one hydrophobic moiety, optional nonionic surfactant, optional thickener, optional cationic polymer, and/or any optional additive can each be present in the concentrate in an amount that is about 2 times (e.g., about 3 times, about 4 times or about 5 times) greater than the concentration recited above for each component so that, when the concentrate is diluted with an equal volume of water (e.g., 2 equal volumes water, 3 equal volumes of water, or 4 equal volumes of water, respectively), each component will be present in the polishing composition in an amount within the ranges set forth above for each component. Furthermore, as will be understood by those of ordinary skill in the art, the concentrate can contain an appropriate fraction of the water present in the final polishing composition in order to ensure that the ceria abrasive, alcohol amine, surfactant having at least one hydrophilic moiety and at least one hydrophobic moiety, optional nonionic surfactant, optional thickener, optional cationic polymer and/or any optional additive are at least partially or fully dissolved in the concentrate.

Embodiments of the invention also provide a method of polishing a substrate with an embodiment of the polishing composition described herein. The method of polishing a substrate comprises (i) providing a substrate, (ii) providing a polishing pad, (iii) providing a polishing composition according to an embodiment of the invention, (iv) contacting the substrate with the polishing pad and polishing composition, and (v) moving the polishing pad and the polishing composition relative to the substrate to abrade at least a portion of the substrate to polish the substrate.

In particular, some embodiments of the method comprise contacting a substrate with a polishing pad and a polishing composition comprising (a) wet-process ceria abrasive particles having an average particle size of about 120 nm or less, (b) at least one alcohol alcohol amine, (c) at least one surfactant having at least one hydrophilic moiety and at least one hydrophobic moiety, the surfactant having a molecular weight of about 1000 or more, and (d) water, wherein the polishing composition has a pH of about 6 or more. The method further comprises moving the polishing pad and the polishing composition relative to the substrate to abrade at least a portion of the substrate to polish the substrate.

In the contacting step, the polishing composition is presented in a suitable quantity as will be appreciated by one of ordinary skill in the art.

The abrading step is conducted for a suitable amount of time, e.g., to achieve the desired polishing of the substrate.

The polishing composition can be used to polish any suitable substrate and is especially useful for polishing substrates comprising at least one layer (typically a surface layer) comprised of a low dielectric material. Suitable substrates include wafers used in the semiconductor industry. The wafers typically comprise or consist of, for example, a metal, metal oxide, metal nitride, metal composite, metal alloy, a low dielectric material, or combinations thereof. The method of the invention is particularly useful for polishing substrates comprising silicon oxide, and/or polysilicon, such that some portion of the silicon oxide and/or polysilicon is removed from the substrate to polish the substrate.

The dielectric layer (e.g., silicon oxide) to be polished with the inventive polishing composition can have any suitable dielectric constant, such as a dielectric constant of about 3.5 or less, e.g., about 3 or less, about 2.5 or less, about 2 or less, about 1.5 or less, or about 1 or less. Alternatively, or in addition, the dielectric layer can have a dielectric constant of about 1 or more, e.g. about 1.5 or more, about 2 or more, about 2.5 or more, about 3 or more, or about 3.5 or more. Thus, the dielectric layer can have a dielectric constant within a range bounded by any two of the foregoing endpoints. For example, the dielectric layer can have a dielectric constant between about 1 and about 3.5, e.g., between about 2 and about 3, between about 2 and about 3.5, between about 2.5 and about 3, between about 2.5 and about 3.5.

In certain embodiments, the substrate comprises polysilicon in combination with silicon oxide and/or silicon nitride. The polysilicon can be any suitable polysilicon, many of which are known in the art. The polysilicon can have any suitable phase, and can be amorphous, crystalline, or a combination thereof. The silicon oxide similarly can be any suitable silicon oxide, many of which are known in the art. Suitable types of silicon oxide include but are not limited to borophosphosilicate glass (BPSG), plasma-enhanced tetraethyl orthosilicate (PETEOS), tetraethyl orthosilicate (TEOS), thermal oxide, undoped silicate glass, and high density plasma (HDP) oxide.

The polishing composition desirably exhibits a high removal rate when polishing a substrate comprising silicon oxide according to a method of the invention. For example, when polishing silicon wafers comprising, high density plasma (HDP) oxides and/or plasma-enhanced tetraethyl ortho silicate (PETEOS), spin-on-glass (SOG) and/or tetraethyl orthosilicate (TEOS) in accordance with an embodiment of the invention, the polishing composition desirably exhibits a silicon oxide removal rate of about 400 Å/min or higher, e.g., about 700 Å/min or higher, about 1,000 Å/min or higher, about 1,250 Å/min or higher, about 1,500 Å/min or higher, about 1,750 Å/min or higher, about 2,000 Å/min or higher, about 2,500 Å/min or higher, about 3,000 Å/min or higher, about 3,500 Å/min or higher about 4000 Å/min or higher, about 4500 Å/min or higher, or about 5000 Å/min or higher.

The polishing composition desirably exhibits a low removal rate when polishing a substrate comprising polysilicon and/or silicon nitride according to a method of the invention. For example, when polishing silicon wafers comprising polysilicon in accordance with an embodiment of the invention, the polishing composition desirably exhibits a removal rate of polysilicon and/or silicon nitride of about 1,000 Å/min or lower, e.g., about 750 Å/min or lower, about 500 Å/min or lower, about 250 Å/min or lower, about 100 Å/min or lower, about 50 Å/min or lower, about 25 Å/min or lower, 10 Å/min or lower, or even about 5 Å/min or lower.

For example, in some embodiments, polishing compositions and methods of the invention are useful in applications having polysilicon squares separated by silicon oxide trenches. In some embodiments, the polishing composition can be used for stop-on-poly (SOP) applications such as for "NAND flash" polishing for non-volatile memory devices which are susceptible to defects such as scratches. Desirably, in some embodiments, use of polishing compositions and methods according to the invention can enhance the yield of wafers to at least about 90%, e.g., at least about 92%, at least about 95%, at least about 97%, etc.

The polishing composition desirably exhibits low dishing when polishing a substrate, as determined by suitable techniques. For example, when polishing patterned silicon wafers including trenches filled with a dielectric layer (e.g., oxide) with an embodiment or the invention, the polishing composition desirably exhibits dishing of about 2500 Å or lower, e.g., about 2000 Å or lower, about 1750 Å or lower, about 1500 Å or lower, about 1250 Å or lower, about 1000 Å or lower, about 750 Å or lower, about 500 Å or lower, about 250 Å or lower, about 100 Å or lower, about 50 Å or lower, or about 25 Å or lower.

The polishing composition desirably exhibits low particle detects when polishing a substrate, as determined by suitable techniques. Particle defects on a substrate polished with the inventive polishing composition can be determined by any suitable technique. For example, laser light scattering techniques, such as dark field normal beam composite (DCN) and dark field oblique beam composite (DCO), can be used to determine particle defects on polished substrates. Suitable instrumentation for evaluating particle defectivity is available from, for example, KLA-Tencor SURFSCAN™ SP1 instruments operating at a 120 nm threshold or at 160 nm threshold).

A substrate, especially silicon comprising silicon oxide and/or polysilicon, polished with the polishing composition desirably has a DCN value of about 20,000 counts or less, e.g., about 17,500 counts or less, about 15,000 counts or less, about 12,500 counts or less, about 3,500 counts or less, about 3,000 counts or less, about 2,500 counts or less, about 2,000 counts or less, about 1,500 counts or less, or about 1000 counts or less. Preferably a substrate polished in accordance with an embodiment of the invention has a DCN value of about 750 counts or less, e.g., about 500 counts, about 250 counts, about 125 counts, or even about 100 counts or less.

A substrate polished with an embodiment of the polishing composition desirably exhibits low total scratch count as determined by suitable techniques. For example, the polishing composition desirably exhibits a total scratch count of about 90 counts or less, e.g., about 80 counts or less, about 70 counts or less, about 60 counts or less, about 50 counts or less, about 40 counts or less, about 30 counts or less, about 20 counts or less, about 10 counts or less, about 5 counts or less, about 2 counts or less, or about 1.5 counts or less.

When polishing a polysilicon substrate with an embodiment of the polishing composition, polysilicon loss from a substrate can be measured from the edge, middle, and center of the polysilicon substrate. The polishing composition desirably exhibits uniformity of polysilicon loss when polishing a substrate, as determined by suitable techniques. For example, the polysilicon loss values from the edge, middle, and center of a polysilicon substrate are desirably within about 50 Å of one another, e.g., within about 40 Å of one another, within about 30 Å of one another, within about 20 Å of one another, within about 10 Å of one another, within about 5 Å of one another, within about 2.5 Å of one another, within about 1.0 Å of one another, or within about 0.1 Å of one another.

The polishing composition can be tailored to provide effective polishing selective to specific materials, while at the same time minimizing surface imperfections, defects, corrosion, erosion and the removal of stop layers. The selectivity can be controlled, to some extent, by altering, the relative concentrations of the components of the polishing composition. When desirable, the polishing composition can be used to polish a substrate with a silicon dioxide to polysilicon polishing selectivity of about 5:1 or higher e.g., about 10:1 or higher, about 15:1 or higher, about 25:1 or higher, about 50:1 or higher, about 100:1 or higher, or about 150:1 or even higher. Certain formulations can exhibit even higher silicon dioxide to polysilicon selectivities, such as about 20:1 or higher, or even about 30:1 or higher.

In accordance with the invention, a substrate can be planarized or polished with the polishing composition described herein by any suitable technique. The polishing methods of the invention are particularly suited for use in conjunction with a CMP apparatus. Typically, the CMP apparatus comprises a platen, which, when in use, is in motion and has a velocity that results from orbital, linear, or circular motion, a polishing pad in contact with the platen and moving with the platen when in motion, and a carrier that holds a substrate to be polished by contacting and moving relative to the surface of the polishing pad. Embodiments of the polishing composition allow for increased platen speeds (e.g., about 50 rpm or greater, such as about 100 rpm or greater.) The polishing of the substrate takes place by the substrate being placed in contact with the polishing composition of the invention and desirably a polishing pad and then abrading at least a portion of the surface of the substrate, e.g., one or more of the subsume materials described herein, with the polishing composition to polish the substrate.

A substrate can be polished with the polishing composition using any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof. Soft polyurethane polishing pads are particularly useful in conjunction with the inventive polishing method. Typical pads include but are not limited to SURFIN™ 000, SURFIN™ SSW1, SPM3100 (commercially available from, for example, Eminess Technologies), POLITEX™, and Fujibo POLYPAS™ 27. A particularly preferred polishing pad is the EPIC™ D100 pad commercially available from Cabot Microelectronics.

Desirably, the CMP apparatus further comprises an in situ polishing endpoint detection system, many of which are known in the art. Techniques for inspecting and monitoring the polishing process by analyzing light or other radiation reflected from a surface of the workpiece are known in the art. Such methods are described, for example, in U.S. Pat. No. 5,196,353, U.S. Pat. No. 5,433,651, U.S. Pat. No. 5,609,511, U.S. Pat. No. 5,643,046, U.S. Pat. No. 5,658,183, U.S. Pat. No. 5,730,642, U.S. Pat. No. 5,838,447, U.S. Pat. No. 5,872,633, U.S. Pat. No. 5,893,796, U.S. Pat. No. 5,949,927, and U.S. Pat. No. 5,964,643. Desirably, the inspection or monitoring of the progress of the polishing process with respect to a workpiece being polished enables the determination of the polishing end-point, i.e., the determination of when to terminate the polishing process with respect to a particular workpiece.

The following examples further illustrate the invention but, of course, should not be construed as in any way limiting its scope.

Example 1

This example demonstrates the effect of adding bifunctional polyester-including surfactant to four different Polishing Compositions (1A-1D). The polishing compositions in this example comprised 0.43% wet process cerin abrasive particles of an average particle size of about 120 nm or less, 1800 ppm polyethylene glycol 8000, 18 ppm picolinic acid, with varying amounts of bifunctional polyester-including surfactant (polyol), and varying levels of triethanolamine. The surfactant and triethanolamine levels of each polishing composition are listed in Table 1A.

The following measurements were taken for each polishing composition after polishing an appropriate substrate with Polishing Compositions 1A-1D: 1) the removal rate of silicon oxide from homogenous silicon oxide films (blanket wafers); 2) polysilicon removal rate from homogenous polysilicon film (polysilicon blanket wafers); 3) the dishing a polishing composition exhibited on silicon oxide filled trenches patterned into a polysilicon film (pattern wafers); 4) polysilicon loss performance from pattern wafers consisting of 7000 Å of silicon oxide deposited atop a 2200 Å polysilicon base (polysilicon loss wafers); and 5) the total scratch exhibited by Polishing Compositions 1A-1D on polysilicon blanket wafers.

Figure 2:
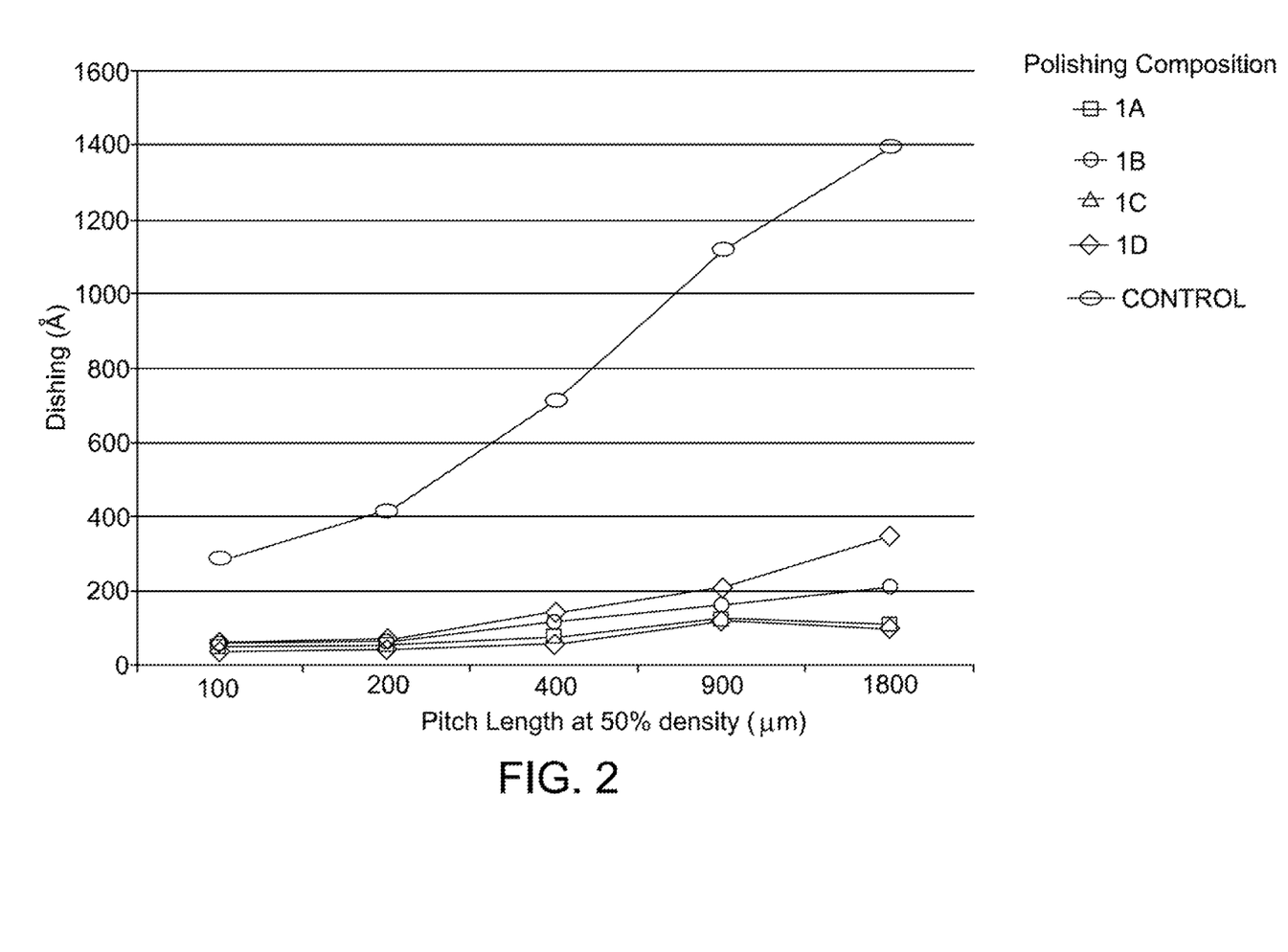
FIG. 2 is a line graph of dishing Y-axis) versus pitch length at 50% density (X-axis) of the polishing compositions of Example 1 herein.

The dishing of Polishing Compositions 1A-1D was compared to a first control, labeled Control in FIG. 2. The control was comprised of 4285 ppm PEG 8000, 43 ppm picolinic acid, and 0.72% wet-process ceria abrasive particles of an average particle size of about 120 nm or less.

Figure 3:
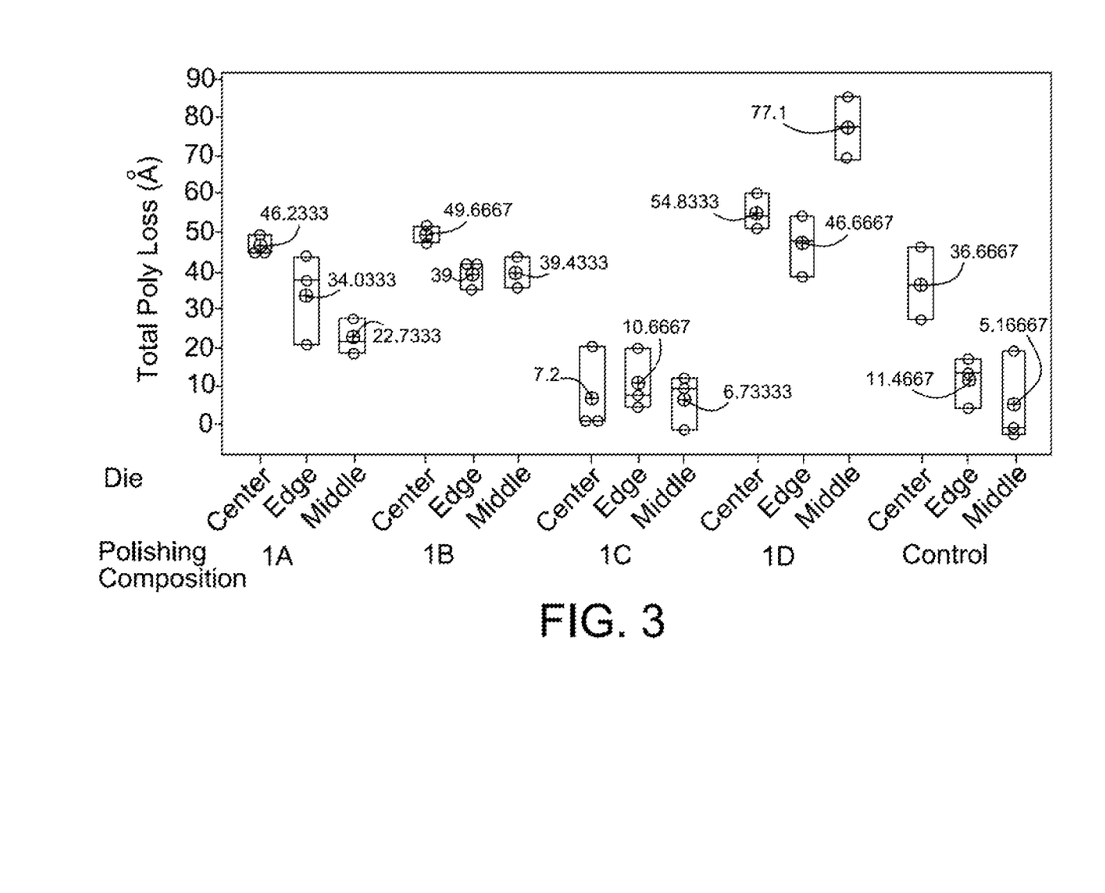
FIG. 3 is a box plot of total polysilicon loss (Y-axis) of the polishing compositions of Example 1 herein (X-axis).

The polysilicon loss performance of Polishing Compositions 1A-1D was compared to a second control polishing composition. The second control, labeled Control in FIG. 3, is comprised of 2500 ppm Pluronic® L31 (BASF, Chicago, Ill.) and 160 ppm Dequest® 2000 (Thermphos International BV, Vlissingen, NL).

Blanket wafers of tetraethyl orthosilicate (TEOS), high density plasma (HDP), and polysilicon were polished with Polishing Compositions 1A-1D. Additionally, pattern wafers and polysilicon loss wafers were polished with Polishing Compositions 1A-1D. Polishing was performed on a Mirra™ CMP apparatus (Applied Materials, Inc., Santa Clara, Calif.). The polishing parameters of the Mirra™ process are set forth in Table 1B below.

Dishing was measured by an F5 ellipsometry device (KLA-Tencor, Milpitas, Calif.) by comparing the difference in thickness between the silicon oxide film within a trench and the surrounding polysilicon film, wherein a larger difference corresponds to a higher dishing rate.

Figure 1:
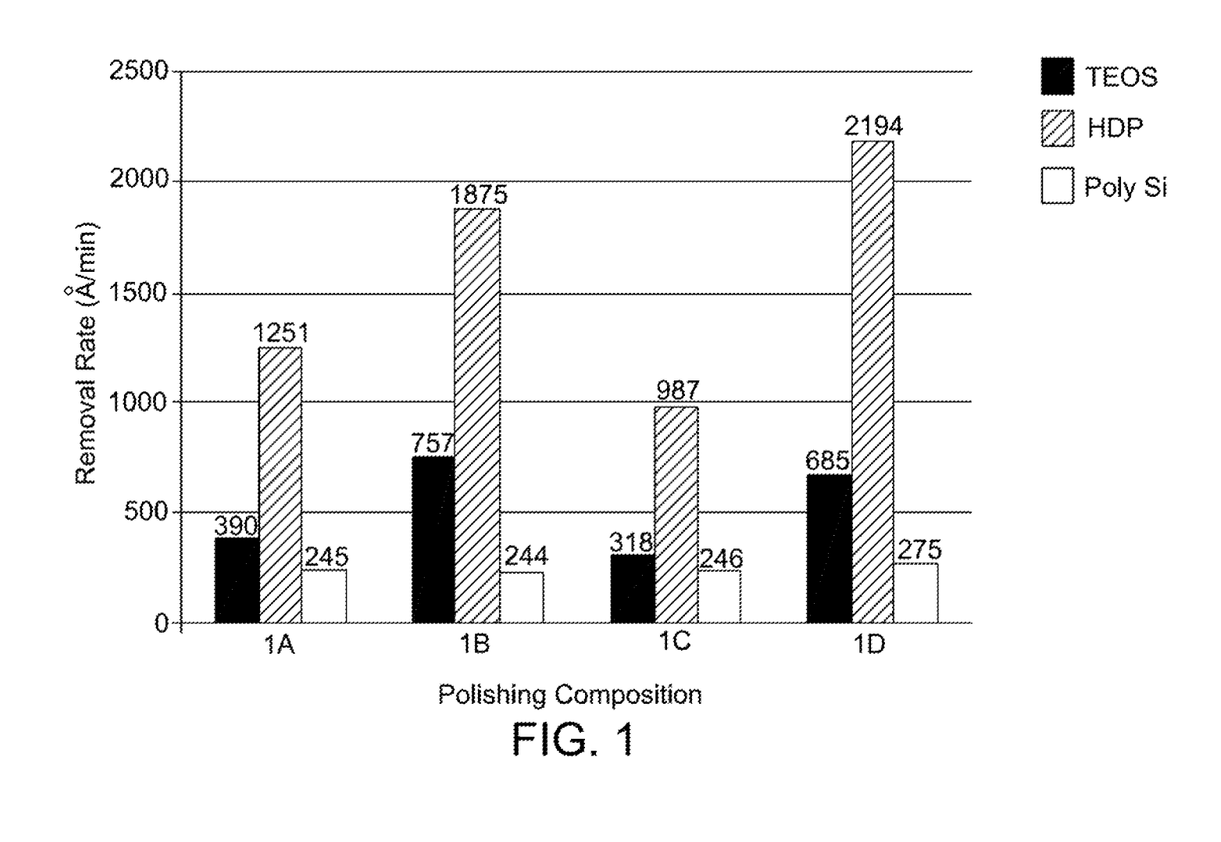
FIG. 1 is a bar graph of tetraethyl orthosilicate (TEOS), high density plasma (HDP), and polysilicon removal rates (Y-axis) of the polishing compositions of Example 1 herein (X-axis).

Following polishing, the TEOS, HDP, and polysilicon removal rates for each polishing composition were measured in Å/min. The results are illustrated in FIG. 1, which is a bar graph displaying the removal rate (Y-axis) of the three surface wafer types for a particular polishing composition (X-axis).

Dishing for each polishing composition was measured in Å and illustrated in FIG. 2, which is a line graph illustrating dishing (Y-axis) measured within pitches of varying length (X-axis) for each polishing composition. Additionally, following polishing, total polysilicon loss for each polishing composition was measured in Å. The results are illustrated in FIG. 3, which is a box plot of total polysilicon loss (Y-axis) exhibited by a particular polishing composition at the center, middle, and edge of the polysilicon loss wafer (X-axis).

Figure 4:
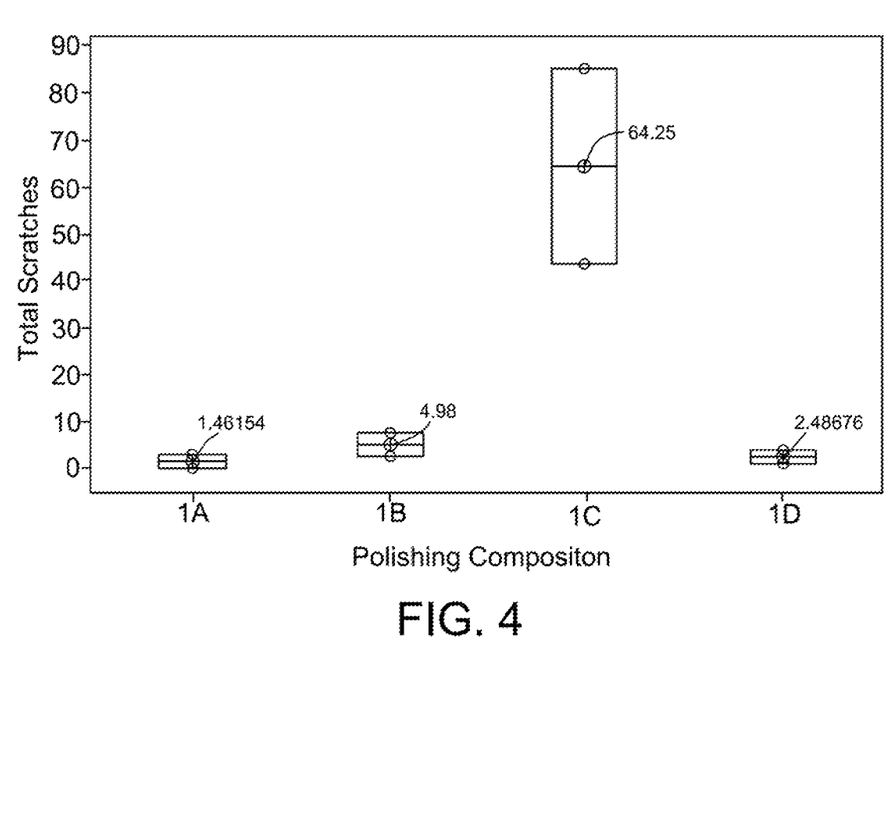
FIG. 4 is a box plot of total scratch (Y-axis) of the polishing compositions (X-axis) of Example 1 herein.

Furthermore, following polishing, total scratch exhibited by each polishing composition was measured using a scanning electron microscope programmed to locate wafer surface defects. The results are illustrated in FIG. 4, which is a box plot of total scratch (Y-axis) exhibited by a particular polishing composition (X-axis).

TABLE 1A

Polishing Composition Summary

| Polishing Composition | Polyol Level (ppm) | Triethanolamine Level (ppm) |
|---|---|---|
| 1A | 250 | 1000 |
| 1B | 100 | 1000 |
| 1C | 250 | 500 |
| 1D | 100 | 500 |

TABLE 1B

Mirra ™ Process Parameters

| Parameter | Value |
|---|---|
| Retaining Ring Pressure | 37.9 kPa (5.5 psi) |
| Membrane Pressure | 20.7 kPa (3 psi) |
| Head Speed | 85 rpm |
| Platen Speed | 100 rpm |
| Flow Rate | 150 ml/min |
| Conditioner | A low cut-rate block diamond with minimal variation (Model S8031C7, commercially available from Saesol Diamond Ind., Co., Ltd., Korea) |
| Conditioner Downforce | 1.361 kg (3 lb) |
| Conditioning | 100% in situ |
| Polishing Pad | Dow IC1010 ™ polishing pad |

These results demonstrate that the addition of bifunctional polyester-including surfactant to Polishing Compositions 1A-1D produced several desirable effects.

In particular, Polishing Compositions 1A-1D exhibited high HDP removal rates while maintaining low polysilicon removal rates. The TEOS removal rates for Polishing Compositions 1A-1D also remained higher than the polysilicon removal rate for each polishing composition.

Additionally, these results demonstrate that the presence of bifunctional polyester-including surfactant in Polishing Compositions 1A-1D substantially improved dishing performance when compared to the control. In particular, the control exhibited dishing of 300 Å at a 100 micron pitch length, while Polishing Compositions 1A-1D exhibited dishing below 200 Å at the 100 micron pitch length. At the 1800 micron pitch length, the longest length tested, the dishing of Polishing Compositions 1A-1D remained below 400 Å, while the control exhibited dishing greater than 1000 Å.

Furthermore, these results demonstrate that the presence of bifunctional polyester-including surfactant in Polishing Compositions 1A-1C produced more uniform polysilicon loss on silicon loss wafers when compared to the control. Uniformity was measured by comparing the total polysilicon loss from the center, middle, and edge of a polysilicon loss water, wherein closer values indicate a greater and more ideal uniformity. Total polysilicon loss is also ideally as low as possible.

In particular, Polishing Composition 1C exhibited near-complete uniformity as the total polysilicon loss values measured at the center, middle, and edge of the polysilicon loss water were within 4 Å of one other. All three polysilicon loss values measured for polishing composition 1C were under 11 Å as well. These results are an improvement over the control polishing composition, which lacked uniformity, particularly when comparing its center polysilicon loss to its edge and middle polysilicon loss. The control polishing, composition also exhibited polysilicon loss above 35 Å at the center of the polysilicon loss wafer.

Finally, these results demonstrate that the presence of bifunctional polyester-including surfactant in Polishing Compositions 1A-1D produced acceptable levels of scratch, particularly in Polishing Compositions 1A, 1B and 1D.

Although Polishing Composition 1C exhibited the highest total scratch of the group, its results are comparable with the commercially acceptable scratch counts of the control polishing composition.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "having," "including," and "comprising" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A chemical-mechanical polishing composition comprising:
   (a) wet-process ceria abrasive particles having an average particle size of about 120 nm or less;
   (b) at least one alcohol amine;
   (c) at least one surfactant having at least one hydrophilic moiety and at least one hydrophobic moiety, the surfactant having a molecular weight of about 1000 or more; and
   (d) water;
   wherein the composition has a pH of about 6 or more.

2. The polishing composition of claim 1, wherein the abrasive particles have an average primary particle size of about 65 nm or less.

3. The polishing composition of claim 1, wherein the abrasive particles are present in an amount from 0.001 wt. % to about 2 wt. % of the composition.

4. The polishing composition of claim 1, wherein the alcohol amine has a pKi from about 6 to about 10.

5. The polishing composition of claim 1, wherein the alcohol amine bears a functional group having a pKa of from about 7 to about 11.

6. The polishing composition of claim 1, wherein the alcohol amine is 2-dimethylamino-2-methylpropanol, triethanolamine, diethanolamine, ethanolamine, 2-amino-2-methyl-1,3-propanediol, Bis-Tris, Tris or any combination thereof.

7. The polishing composition of claim 1, wherein the alcohol amine is present in an amount from about 0.001 wt. % to about 1 wt. % of the composition.

8. The polishing composition of claim 1, wherein the surfactant is of the following formula:

wherein A and C are hydrophilic moieties, and R is a hydrophobic moiety.

9. The polishing composition of claim 8, wherein the surfactant is bifunctional and A and C are the same.

10. The polishing composition of claim 8, wherein at least one of A and C contains at least one of ester, carboxylic, and alcohol functional groups, or any combination thereof.

11. The polishing composition of claim 8, wherein at least one of A and C contains the alcohol functional group attached to a primary carbon.

12. The polishing composition of claim 8, wherein at least one of A and C contains the carboxylic functional group attached to a tertiary carbon.

13. The polishing composition of claim 8, wherein R has a molecular weight from about 100 to about 10000.

14. The polishing composition of claim 1, wherein the surfactant is represented by the following formula:

15. The polishing composition of claim 1, wherein the surfactant has a molecular weight from about 500 to about 5000.

16. A method of chemically-mechanically polishing a substrate, which method comprises:
   (i) contacting a substrate with a polishing pad and the polishing composition comprising:
      (a) wet-process ceria abrasive particles having an average particle size of about 120 nm or less;
      (b) at least one alcohol amine;
      (c) at least one surfactant having at least one hydrophilic moiety and at least one hydrophobic moiety, the surfactant having a molecular weight of about 1000 or more; and
      (d) water;
      wherein the composition has a pH of about 6 or more; and
   (ii) moving the polishing pad and the polishing composition relative to the substrate to abrade at least a portion of the substrate to polish the substrate.

17. The method of claim 16, wherein the substrate comprises polysilicon and silicon oxide, and wherein at least the silicon oxide is removed from the substrate to polish the substrate.

18. The method of claim 17, wherein more silicon oxide than polysilicon is removed from the substrate to polish the substrate.

19. The method of claim 16, wherein the alcohol amine is 2-dimethylamino-2-methylpropanol, triethanolamine, diethanolamine, ethanolamine, 2-amino-2-methyl-1,3-propanediol, Bis-Tris, Tris or any combination thereof.

20. The method of claim 16, wherein the surfactant is of the following formula:

A-R—C, wherein A and C are hydrophilic moieties, and R is a hydrophobic moiety.

* * * * *